US006738020B1

(12) United States Patent
Lindskog et al.

(10) Patent No.: US 6,738,020 B1
(45) Date of Patent: May 18, 2004

(54) ESTIMATION OF DOWNLINK TRANSMISSION PARAMETERS IN A RADIO COMMUNICATIONS SYSTEM WITH AN ADAPTIVE ANTENNA ARRAY

(75) Inventors: Erik D. Lindskog, Sunnyvale, CA (US); Mitchell D. Trott, Mountain View, CA (US); Hafedh Trigui, Toronto (CA); Serge de la Barbosa, San Raphael, CA (US)

(73) Assignee: ArrayComm, Inc., San Jose, CA (US)

( * ) Notice: Subject to any disclaimer, the term of this patent is extended or adjusted under 35 U.S.C. 154(b) by 70 days.

(21) Appl. No.: 10/153,515

(22) Filed: May 21, 2002

Related U.S. Application Data

(60) Provisional application No. 60/309,448, filed on Jul. 31, 2001.

(51) Int. Cl.$^7$ ................................................. H01Q 3/00
(52) U.S. Cl. ...................... 342/377; 342/175; 342/378
(58) Field of Search ............................ 342/44, 50, 174, 342/377, 378

(56) References Cited

U.S. PATENT DOCUMENTS

| | | | | | |
|---|---|---|---|---|---|
| 4,816,825 | A | * | 3/1989 | Chan et al. | 340/825.5 |
| 5,543,801 | A | * | 8/1996 | Shawyer | 342/354 |
| 5,546,090 | A | | 8/1996 | Roy, III et al. | |
| 6,037,898 | A | * | 3/2000 | Parish et al. | 342/174 |
| 6,484,096 | B2 | * | 11/2002 | Wong et al. | 701/213 |
| 6,496,140 | B1 | * | 12/2002 | Alastalo | 342/174 |
| 6,594,509 | B1 | * | 7/2003 | Takakusaki et al. | 455/562.1 |
| 2003/0025633 | A1 | * | 2/2003 | Cai et al. | 342/378 |

FOREIGN PATENT DOCUMENTS

WO    WO99/57820    11/1999

OTHER PUBLICATIONS

IEEE Transactions on Signal Processing, vol. 41, No. 1, Jan. 1993, pp. 414–417.

Aste et al., Downlink Beamforming Avoiding DOA Estimation for Cellular Mobile Communications, 1998 IEEE, pp. 3313–3316.

Farsakh et al., Spatial Covariance Based Downlink Beamforming in an SDMA Mobile Radio System, 1998 IEEE, pp. 1497–1506.

Aumann et al., Phased Array Antenna Calibration and Pattern Prediction Using Mutual Coupling Measurements, 1989 IEEE, pp. 844–850.

Hochwald et al., Adapting a Downlink Array from Uplink Measurements, 2001 IEEE, pp. 642–653.

* cited by examiner

*Primary Examiner*—Thomas H. Tarcza
*Assistant Examiner*—Isam Alsomiri
(74) *Attorney, Agent, or Firm*—Blakely, Sokoloff, Taylor & Zafman LLP

(57) ABSTRACT

A method and apparatus are provided that allows system calibration to be incorporated into a single function that also derives transmit parameters from receive parameters in a spatial diversity system. In one embodiment, the invention includes receiving signals at an antenna array from a plurality of different locations, deriving characterizations of the spatial parameters of the received signals, receiving measurements of a plurality of different signals transmitted from the antenna array to a plurality of different locations, deriving characterizations of the spatial parameters of the transmitted signals from the received measurements, and generating a transformation function for producing transmit spatial parameters based on measurements of received signals using the receive spatial parameter characterizations and the transmit spatial parameter characterizations.

36 Claims, 3 Drawing Sheets

ESTIMATION OF DOWNLINK TRANSMISSION PARAMETERS IN A RADIO COMMUNICATIONS SYSTEM WITH AN ADAPTIVE ANTENNA ARRAY

CROSS REFERENCE TO RELATED APPLICATION

This application claims the benefit of U.S. Provisional Patent Application Serial No. 60/309,448, for Statistical Calibration of Wireless Base Stations, to inventors Barbosa Da Torre, Parish, Kasapi, Lindskog, Trott and Kerr, Assignee ArrayComm, Inc., filed Jul. 31, 2001.

BACKGROUND OF THE INVENTION

1. Field of the Invention

The invention relates generally to the field of digital radio signal communications using adaptive antenna arrays. More particularly, the invention relates to deriving a transformation function to generate transmit waveform for a system user terminal using a waveform received from the system user terminal.

2. Description of the Related Art

Radio communications capacity can be greatly increased using directional, rather than omni-directional radio transmission. One way to transmit directional signals and directionally receive signals is by using beam forming and nulling through an array of antennas. Other antenna array strategies can be combined with beam forming and nulling when appropriate to the application.

The precision of the beam forming and nulling using an antenna array, can be improved if the transmit and receive chains, from the digital interface at baseband to the field radiated from each antenna element is accurately calibrated. Errors can arise from differences between the antenna elements as well as differences in the hardware used for phasing, amplifying and modulating or demodulating communicated radio signals, among other things. One way of making the calibration is to have a remote, portable RF transponder listen to the output of the antenna array on a base station downlink frequency and re-transmit the downlink signal that it receives from the base station, on the base station's uplink frequency. By selecting appropriate signals to transmit and appropriate signals to receive, the base station can apply signal processing to estimate compensations in phase and amplitude to calibrate its transmit and receive chains. Such a technique requires external equipment including additional radios and either directional couplers or additional antennas mounted somewhere visible to the base station.

The precision of the beam forming and nulling from an antenna array can also be improved if the parameters of the radio channel to the subscriber can be accurately characterized. Since the subscriber may be moving and the signal propagation channel may be changing, precision is improved with frequent channel estimates. The channel can be characterized using the response of the antenna elements to a signal received from the subscriber, for example, by estimating the phase and amplitude response of the receive section of each antenna element. The phase and amplitude responses can be expressed as an uplink spatial signature for a particular user and a particular array. The uplink spatial signature can be used to generate a downlink spatial signature, which can be used in directing a beam to the subscriber over the same signal propagation channel used for reception. Accurately converting an uplink signature to a downlink signature enhances the accuracy of many directional techniques that can be performed with an antenna array.

Constantly and consistently making measurements that provide a high level of precision for both the calibration and the uplink to downlink transition can require a significant amount of processing power. It may also require additional equipment. If the precision of these measurements is not maintained, then service quality and system capacity can be reduced.

BRIEF SUMMARY OF THE INVENTION

A method and apparatus are provided that allows system calibration to be incorporated into a single function that also derives transmit parameters from;receive parameters in a spatial diversity system. In one embodiment, the invention includes receiving signals at an antenna array from a plurality of different locations, deriving characterizations of the spatial parameters of the received signals, receiving measurements of a plurality of different signals transmitted from the antenna array to a plurality of different locations, deriving characterizations of the spatial parameters of the transmitted signals from the received measurements, and generating a transformation function for producing transmit spatial parameters based on measurements of received signals using the receive spatial parameter characterizations and the transmit spatial parameter characterizations.

Other features of the present invention will be apparent from the accompanying drawings and from the detailed description that follows.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

Introduction

Figure 1:
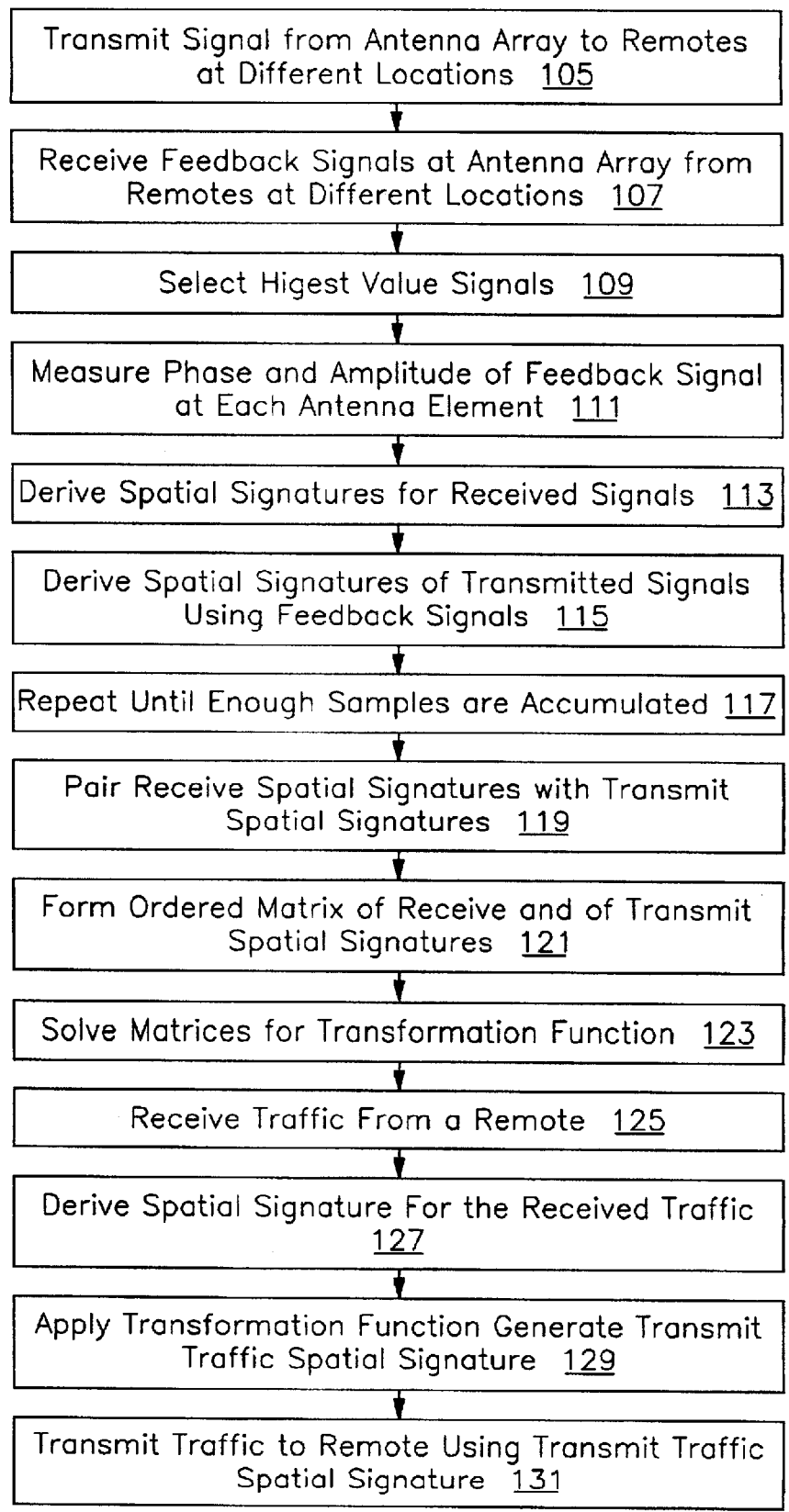
FIG. 1 is a flow chart showing one embodiment of the present invention.

The present invention allows a transformation function to be created that will allow quick and accurate conversion from receive parameters to transmit parameters. The transformation function can include a calibration of the hardware in the transmit and receive chains as well as a compensation for the difference between the receive and the transmit channel. In one embodiment, the transformation function is a matrix that converts an uplink spatial signature to a downlink spatial signature through simple matrix multiplication. The downlink spatial signature can be used to transmit signals to a remote radio.

The transformation function can be generated from a collection of measurements of receive and transmit signals, such as uplink and downlink spatial signatures. Using a large enough number of paired receive and transmit measurements, a function can be generated that provides sufficient accuracy. In one embodiment, the uplink spatial signatures are necessary to demodulate the received signals. As a result, there is no additional processing burden on the system to produce the uplink spatial signatures.

The measurements of the transmit signals can be obtained from the receiving remote radios. Many air interface standards including GSM (Global System for Mobile Communications) and WCDMA (Wideband Code Division Multiple Access) support feedback from remote terminals that provide information on power and sometimes also phase to the base station. As a result, data can be collected for downlink spatial signatures without violating or interfering with existing standards. The same uplink message that provides the feedback can also be measured to derive the uplink spatial signature. Pairing the uplink and downlink spatial signatures can result in a still more accurate transformation function. Uplink and downlink signatures can be paired and plugged into extended matrices. A transformation matrix can be derived from these extended matrices. Alternatively, additional signaling can be added to existing standards or incorporated into new standards that will provide feedback from remote terminals regarding power, phase or other useful parameters of the downlink signals.

In one embodiment, the present invention is implemented in an SDMA (Spatial Division Multiple Access) radio data communications system. The SDMA technology can be combined with code, time and frequency division technologies to further enhance system capacity or service quality. In such a spatial division system, each terminal is associated with a set of spatial parameters that relate to the radio communications channel between, for example, the base station and a user terminal. The spatial parameters can include a spatial signature for each terminal. A spatial signature can consolidate the spatial parameters into a single set of values for each antenna element of the array. In one embodiment, the spatial signature is a sequence of complex numbers that each represent phase and amplitude for an antenna element.

Using the spatial signature and arrayed antennas, the RF energy from the base station can be more precisely directed at a single user terminal, reducing interference with and lowering the noise threshold for other user terminals. Conversely, data received from several different user terminals at the same time can be resolved at lower receive energy levels. With spatial division antennas at the user terminals, the RF energy required for communications can be even less. The benefits are even greater for subscribers that are spatially separated from one another. The spatial signatures can include such information as the spatial location of the transmitters, the directions-of-arrival (DOAs), times-of-arrival (TOAs) and the distance from the base station.

Estimates of parameters such as signal power levels, DOAs, and TOAs can be determined using known training sequences placed in digital data streams for the purpose of channel estimation or channel equalization in conjunction with sensor (antenna) array information. This information is then used to calculate appropriate weights for spatial demultiplexers, multiplexers, and combiners. Extended Kalman filters or other types of linear filters, well known in the art, can be used to exploit the properties of the training sequences in determining spatial parameters. Further details regarding the use of spatial division and SDMA systems are described, for example, in U.S. Pat. Nos. 5,828,658, issued Oct. 27, 1998 to Ottersten et al. and 5,642,353, issued Jun. 24, 1997 to Roy, III et al.

Process Flow

Referring to FIG. 1, one radio in the system transmits signals from an antenna array to remote radios that are at different locations 105. The remote radio can be a peer in a radio network or a subscriber terminal in a centralized system. For purposes of discussion, the present embodiment will be described in the context of a base station in a cellular radio system that operates using SDMA together with some other air interface standard such as GSM, DAMPS or WCDMA. In either system, the transmitted signals can be traffic or control channel signals. The antenna array can be composed of several elements each capable of sending a transmit signal that can be distinguished from the others. In WCDMA, pilot signals can be used that can be distinguished by different codes. Accordingly, the base station can send a different pilot signal from each antenna element. The transmitted signals may be sent without any spatial processing in order to simplify the system. Alternatively, spatial processing can be employed to reduce interference with other users and more accurately distinguish signals from different remote radios.

The base station next receives feedback signals at its antenna array from the remote radios 107. The feedback signals can take many different forms depending on the nature of the network and any signaling standards that may be allowed in the network. Most wireless networks provide for some sort of power level control messaging. Current CDMA (Code Division Multiple Access) systems and TDMA (Time Division Multiple Access) systems such as DAMPS (Digital American Mobile Phone Service); and GSM typically require the remote terminal to measure received power and send some information back to the base station related to the measurement. The feedback signals are typically sent as control or signaling bits in a traffic channel.

To produce the transformation function, the parameters of the transmitted signal and a received signal can be compared. The parameters of the transmitted signal can be measured by remote radios that receive the transmitted signals. These measurements can then be sent from the remote radios back to the transmitting station, in this case a base station. The signals can be radioed back to the base station, as discussed above, or sent to the base station in any other manner that is convenient to the construction of the particular system. The structure of some standards such as WCDMA and GSM already provide for the remote radios to return feedback on a return radio channel, so for those systems, it is convenient, but not required to use the existing protocols in the standard.

In some systems both phase and amplitude may be measured and information related to these measurements returned to the base station. If such feedback is not required in the air interface standard used by the network, then special remote radios can be constructed that are able to provide such feedback. Measurements of transmitted signals can be requested from those terminals that are able to reply. By positioning uniquely capable terminals in different locations around the network, enough feedback can be collected to allow for the transformation matrix or function to be determined.

The base station may be able to increase the accuracy of the transformation function by selecting the highest value or most useful signals 109. One way to identify "qualified" calibration sources is by finding those sources with only one significant rake tap on the uplink, in one example, the second tap has more than 10 dB less receive power. This approach assumes a receiver with multiple taps. Another approach is to qualify remote user terminals that have a low angular spread, that is the signal has one main direction of arrival. This can be determined by analyzing the uplink spatial signature from the remote. It can also be determined from measurements of the angle of arrival of the uplink signature over time. Terminals can also be qualified that have low mobility, i.e. are moving slowly with respect to the base station. Mobility can be determined using any of a variety of different techniques well-known in the art. In another example, remote user terminals can be selected that seem to have enough signal headroom to perform accurate calibration. This can be done, for example, by identifying remote user terminals whose current uplink power and downlink power is at less than half of maximum (as determined from power control signaling). The low power remotes will also tend to be those with a clearer and cleaner signal path.

The radio feedback messages also provide a convenient way to measure the parameters of received signals. In one embodiment, the base station simply measures the phase and amplitude of the traffic signal that contains the feedback data as it is received at each antenna element 111. Other signals from remote radios can be used, as appropriate for a particular application.

The measurements of the received signals containing the feedback can be used to derive spatial signatures for each of the received signals 113. The phase and amplitude pair for each antenna receive section can be used to form a complex number, and the collection of these for each of the antenna elements in an array can be used to form a complex valued receive-section weight vector and spatial signature. There are a variety of different ways to form the spatial signature as is well-known in the art and discussed, for example in the patents to Ottersten and Roy mentioned above.

Similarly, the phase and amplitude measurements or amplitude only measurements in the feedback signals can be used to derive spatial signatures for the transmitted signals 115. As with the uplink signatures, the phase and amplitude response of the transmit section of each antenna (from the output of the baseband transmit circuitry to the transmitted electric field at the antenna) can be grouped into a complex-valued transmit-section weight vector and spatial signature as described in more detail below.

In brief, the transmitted signals are generated with a specific known phase and amplitude relationship. The remote user terminal measures the phase and amplitude relationship of the signal that it receives and sends information about this relationship back to the base station. Using the received measurements and the knowledge of the transmitted signals, phase and amplitude values can be generated that reflect how the phase and amplitude are changed through the transmit array and the signal path. These phase and amplitude relationships become the basis of transmit spatial signatures 115.

The specific nature of the feedback signals and how they can be used to generate spatial signatures or similar data sets depends on the type of system to which the present invention is applied. The WCDMA standard, for example, supports two closed loop transmit diversity modes in which the remote user terminal provides some feedback to the base station. The WCDMA transmit diversity schemes are provided in the standard as a way to decrease the effect of fading in downlink signals by placing two antennas widely apart (in order to decrease their spatial correlation). There are two variations on the closed loop scheme, mode 1 and mode 2, which differ primarily in the precision of the measurement performed and fed back by the remote user terminal. Feedback using either mode can be used, however, a higher precision in the feedback measurements will allow the transformation function to be established more quickly.

In mode 2, the WCDMA base station sends the same data out of two different antennas. It does this by sending the signal to the remote user terminal over two antennas with different complex scaling. These two signals are designed to add constructively at the remote user terminal. The base station also transmits one control signal (called the common pilot channel or CPICH) on each antenna but with orthogonal channelization codes (effectively sending two different signals)

The remote user terminal uses these two pilot signals to separately estimate the channel seen from each antenna It then computes a set of weights for phase and amplitude which, if applied to one signal, would maximize the received quality of the combination of signals. These weights are quantized in different ways depending on the closed loop mode, and the quantized result is fed back to the base station. The feedback information is provided during a session while data traffic is being sent to and from the remote. The phase feedback from the remote user terminal is quantized to an accuracy of $\pi/4$ and the amplitude feedback indicates one of two ratios between the two signals. It is also possible to use transmit diversity mode 1, the difference is that only the phase feedback is provided by the remote user terminal (with an accuracy of $\pi/2$).

The purpose of the transmit diversity feedback signal according to standard documents is to allow the base station to continually adjust the complex scaling of its two transmit signals so that they combine favorably, and with equal amplitude, at the user terminal. This process is then repeated every slot.

The standard recommends that the remote user terminal solve for the weight vector w by maximizing:

$$P = w^H H^H w$$

where $H=[h_1, h_2]$ and $w=[w_1, w_2]^T$ and where $h_1$ and $h_2$ are the estimated impulse response of the channel seen on each antenna.

However, this method of solving for the weight vector w is only a recommendation. The standard allows for a remote user terminal to do any other kind of suboptimal solution.

In the WCDMA closed loop transmit diversity modes, two different pilot signals each from a different antenna are compared to each other. In a SDMA system each antenna array can have any number of elements. In order to receive feedback for all of the antenna elements, several different feedback cycles can be used. For example, a first and second element can transmit the two pilot signals and receive feedback, then a first and third element can transmit the pilot signals and receive feedback etc. until all of the elements have participated.

Alternatively, the elements can transmit in groups, this allows some beam forming also to be applied. So, for example with a four element array, the first and second antenna elements can transmit one pilot signal while the third and fourth elements can transmit the other pilot signal. Next, the first and third elements can transmit one pilot signal while the second and fourth elements transmit the other etc. until all the elements can be calibrated against each other. Because of the multiple antenna elements to be measured, remote user terminals can be selected that are not extremely active sending and receiving traffic or a special protocol can be established for this measurement cycle.

If a power level feedback is used, such as is available in GSM and DAMPS, then only one measurement can be made at a time and there is no comparison. Accordingly, the comparisons are made by the base station. So for a four element array, each element can transmit independently and receive a power feedback signal. Alternatively, the elements can transmit in pairs or other small groups until enough measurements have been obtained to solve for the contribution of each individual element. With enough cycles of transmission and feedback, the relative amplitude or phase and amplitude of the transmit chain can be characterized and transmit spatial signatures can be developed.

The collection of spatial signatures for transmitted and received signals is repeated until enough samples are accumulated 117. Enough samples are accumulated when a transformation function can be generated that has sufficient accuracy for the intended application. In one embodiment, samples are collected continuously and the collection of spatial signatures is updated during substantially the entire operation of the base station.

The collection of spatial signatures does not necessarily have a definite starting or stopping point. After a sufficiently large number of remotes have been analyzed, the transformation function will be sufficiently accurate. No one signal is likely to provide a sufficiently accurate function due to multipath fading and other transient effects. Notwithstanding the variability inherent to a typical system, the convergence of the spatial signatures toward an average phase and amplitude can be used as a diagnostic tool. As more samples are taken, the incremental average of the amplitude or phase or spatial signature should move toward a value that is fairly close to the true average of the signals being received. Due to the variability normally inherent in the system from one remote to another, little emphasis should be placed on values from any one remote, unless samples are collected over a long period and from many different locations. By measuring how much the values or vectors change after a certain number of normalized scaled adjustments are added to it, the convergence of the incremental average value can be measured. This can be used to measure the stability and the sufficiency of the collected samples.

Alternatively, the transformation function can be generated after only a few spatial signatures are collected and then updated as additional spatial signatures are collected. This allows the convergence or variance of the transformation function to be measured after each update. When the convergence has reached a satisfactory level or when the transformation ftinction has been stabilized to within a certain threshold, it can be declared as usable. In a simpler embodiment, a number can be selected, e.g. 200, as the number of spatial signatures that must be collected and processed to generate a transformation function before the transfornation function is used. The selected number may range greatly from tens to hundreds depending on network needs.

The collected samples are paired in one embodiment. The receive spatial signatures are paired with the transmit spatial signatures 119. The paired signals each correspond to a single remote terminal and a short time difference. The short difference is associated with the remote being in approximately the same location for both signals. As a result, the difference between an uplink and its paired downlink is an approximation of the transformation function that occurred with that particular signal. By taking a large number of measurements and accumulating a large number of spatial signatures at least some of the variations between different remotes cancel out. The resulting aggregated transformation function can be applied to determine downlink signatures from specific uplink signatures.

If the receive spatial signatures are based on received messages containing feedback signals, then the two can be paired very easily. If the feedback signals are received in other than a useful radio signal that can be received by different elements of the array, then the pairing can be done using other information. For example, the received feedback may be tagged to a particular remote radio. The tags can be compared to tags or identifications of the radios upon which receive spatial signatures are based in order to pair measurements from the same radio.

Having paired the signatures, the combinations can be put together to solve for the transformation function. In one embodiment, each spatial signature is expressed as a vector a in which each term ad is a complex number, i.e. $a_{ij}=(a_i+ja_j)$. Each term in the vector corresponds to an element of the antenna array. For an array with four antenna elements i and j will range from 1 to 4. However, an array may have as few as two elements and as many as eight or more. The vector is an ordered sequence of phase and amplitude measurements, expressed as complex numbers, in which each term corresponds to one of the antenna elements. An ordered matrix can be formed for the receive spatial signatures and for the transmit spatial signatures 121. Each matrix A can be formed of the complete set of k vectors $a_k$ ordered so that the receive and transmit vectors are paired as a result of the ordering. Accordingly the receive matrix $A_{rx}$ made up of k different spatial signatures can be expressed as $A_{rx}=[a_{rx,1}\ a_{rx,2}\ a_{rx,3}\ \ldots\ a_{rx,k}]$. The transmit matrix $A_{tx}$ has the same structure $A_{tx}=[a_{tx,1}\ a_{tx,2}\ a_{tx,3}\ \ldots\ a_{tx,k}]$.

The matrices can be solved for a transformation matrix T 123, however, the matrix format is not necessary. It is a convenience given the expression of spatial signatures as vectors, i.e. ordered sequences of complex numbers, however, there are many other ways to express phase and amplitude combinations at each antenna element and such variation will lead to differences in how the transformation function is best expressed. Using the system of matrices discussed above, the transformation matrix can be derived by generating a matrix that will approximately convert the composite receive vector matrix $A_{rx}$ into the composite transmit vector matrix $A_{tx}$. The following transformation can be used, where H designates a Hermitian matrix, the conjugate transpose of the base matrix:

$$T=A_{tx}A_{rx}{}^H(A_{rx}A_{rx}{}^H)^{-1}$$

In order to solve for T, the phases in the A matrices can be normalized. For example, the first element can be normalized to a value one, the other elements normalized with respect to it. Alternatively T can be determined using $A_{tx}$ $D=T A_{rx}$ is a diagonal matrix of unknown phasors. This can be solved iteratively for D and T. This avoids normalizing the phases.

Because the transformation matrix is based on accumulated data collected from the base station while the base station is in operation, the transformation matrix can compensate for a variety of different real world effects. It can include a calibration of the receive and transmit chains, eliminating the need for any separate calibration process. The transformation matrix in such a case will correct for phase rotations and gain factors of the different receive and transmit chains including radios, analog to digital converters, digital to analog converters, and antennas. Of course, a separate calibration process can be used to correct the spatial signatures before the transformation function is generated. The transformation function can correct for coupling between the antenna elements and it can also be used to compensate for any differences in carrier frequency between received signals and transmitted signals. These differences may result in variations in frequency sources as well as variations in signal propagation at the different frequencies.

Once the transformation function has been derived, it can be applied to send and receive traffic with another radio 125. In the example of a GSM or WCDMA cellular voice or data radio system, it can be applied by a base station to communicate with remote subscribers. The transformation matrix can be used to convert uplink spatial signatures to downlink spatial signatures. With a few modifications of the approach discussed above, a different type of transformation function can be generated to convert measured parameters of uplink signals into parameters that can be used to transmit downlink signals. Similarly, remote subscribers may also employ antenna arrays and spatial processing. The approach described herein can be used by a remote to generate a transformation matrix to convert spatial signatures of received downlink signals to spatial signatures that can be used to transmit uplink signals.

For any one particular remote subscriber radio, the base station will receive traffic or control signals at its receive antenna array and measure the parameters of that signal. In the example above, it will derive a spatial signature for the received traffic from the particular remote subscriber 127. The spatial signature characterizes the signal propagation channel and the location of the subscriber at the time that the traffic was received.

The transformation function is applied to this spatial signature to generate a transmit traffic spatial signature for the particular remote subscriber 129. An accurate uplink spatial signature will help to ensure a more accurate downlink spatial signature. By using the most current information based on signals received from the particular remote, a still more accurate downlink spatial signature is created.

The application of the transformation matrix to an uplink spatial signature can be seen as a direct result of the definition of the transformation matrix provided above. The transmit spatial signature at, for any one remote subscriber can easily be estimated using only the transformation matrix T and the measured receive spatial signature $a_{rx}$ for the particular remote subscriber. $a_{tx}=T\, a_{rx}$. Appropriate changes can be made as required by the format of the particular transformation function that is used.

The downlink spatial signature can then be used to transmit traffic to the remote 131. In one embodiment, the uplink spatial signature and the downlink spatial signature allow the base station to direct the energy of the downlink signal to the remote subscriber, minimizing interference with any other subscribers. The directed transmitted beam can be further modified using other techniques that, for example, direct nulls to other remotes, combat other interference in the network and exploit the capabilities of the antenna array in other ways. In such other techniques, the base station can use the transformation matrix T to estimate downlink signatures of other interferers and users on the network.

In one embodiment, the transformation function is applied separately to each remote subscriber. Since the transformation function provides a simple, and direct transformation from uplink or receive to downlink or transmit, it allows transmitted signals to be optimized individually for each remote without consuming significant processing resources. For higher accuracy, the transformation function can be optimized for particular directions. In a cellular system, for example, the area of the cell can be divided into sectors or subsectors based on the angle of reception or transmission from the base station. Other radios can divide the angular range of communications in a similar way. Using, for example, angle of arrival measurements or spatial signatures, a base station can associate each received signal with a particular angular range or subsector of its cell. A transformation function can then be generated independently for each subsector. The respective transformation function can then be selected and applied based on the location of the remote or the angle of arrival of signals from the remote. The selection and configuration of the subsectors will depend on the particular application.

The same principles can be applied to derive a transformation that operates on other spatial parameters. For example, the received signals can be used to build a receive covariance matrix and the feedback signals can be used to build a transmit covariance matrix. The covariance matrices can be built out of phase and amplitude measurements using any of a variety of different techniques well-known in the art. The results from a large number of signals can be combined as described above with respect to the spatial signatures and a transformation matrix can be derived that approximately converts a receive covariance matrix for a particular remote terminal to a transmit covariance matrix for the remote terminal. The transformation can be applied using $R_{tx}=TR_{rx}T^H$. Where R represents the covariance matrices and T the transformation matrix.

Similarly, the same principles can be applied to eigenvectors. It is well known in the art to determine eigenvectors from a covariance matrix of signal samples. The eigenvectors can be used to determine dominant characteristics of the received signal. A received signal may be characterized by one or a few different eigenvectors. By accumulating receive and transmit eigenvectors for a large number of different signals. A transformation matrix can be derived that will approximately convert a particular receive eigenvector for one remote terminal to a transmit eigenvector for that terminal. Such a transformation can be applied using $E_{tx}=TE_{rx}$. Where E represents the eigenvectors.

The same principles can also be applied to weight vectors. Spatial processing typically employs a spatial signature and a weight vector for both the uplink and the downlink signals. Uplink weight vectors can be derived from received signals using conventional approaches. The corresponding downlink weight vectors can be derived from received feedback measurements from the remotes. By accumulating receive and transmit weight vectors for a large number of different signals. A transformation matrix can be derived that will approximately convert a particular receive weight vector for one remote terminal to a transmit weight vector for that terminal. Using a transformation matrix will tend to preserve for transmission the beam, s and nulls that were present in the signal received at the antenna array and reflected by the receive weights. Such a transformation can be applied using $w_{tx}=Tw_{rx}$. Where w represents the weight vectors.

Base Station Structure

Figure 2:
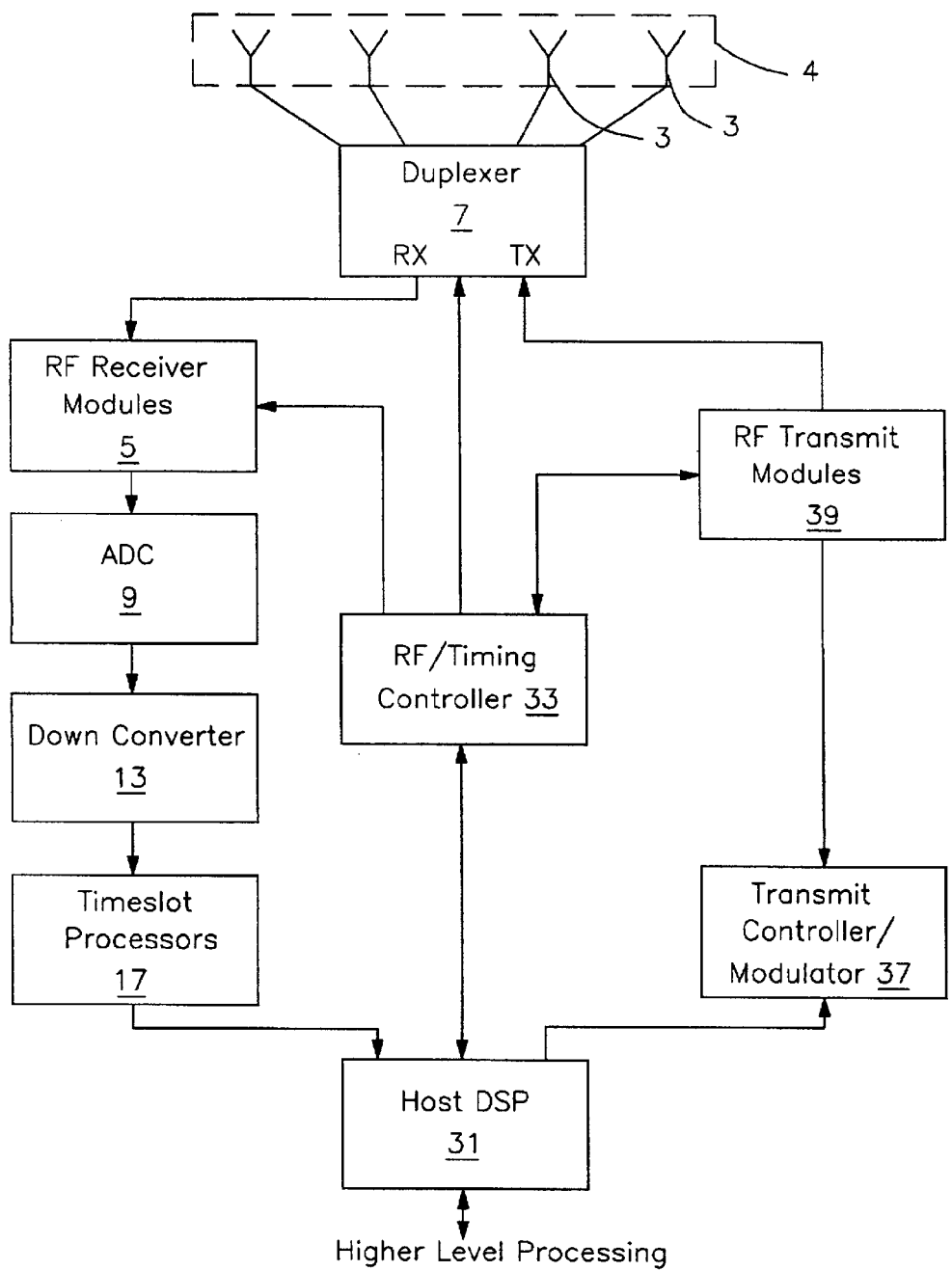
FIG. 2 is a simplified block diagram of a base station on which an embodiment of the invention can be implemented.

The present invention relates to wireless communication systems and may be a fixed-access or mobile-access wireless network using spatial division multiple access (SDMA) technology in combination with multiple access systems, such as time division multiple access (TDMA), frequency division multiple access (FDMA) and code division multiple access (CDMA). Multiple access can be combined with frequency division duplexing (FDD) or time division duplexing (TDD). FIG. 2 shows an example of a base station of a wireless communications system or network suitable for implementing the present invention. The system or network includes a number of subscriber stations, also referred to as remote terminals or user terminals, such as that shown in FIG. 2. The base station may be connected to a wide area network (WAN) through its host DSP 31 for providing any required data services and connections external to the immediate wireless system. To support spatial diversity, a plurality of antennas 3 is used to form an antenna array 4, for example four antennas, although other numbers of antennas may be selected.

A set of spatial multiplexing weights for each subscriber station are applied to the respective modulated signals to produce spatially multiplexed signals to be transmitted by the bank of four antennas. The host DSP 31 produces and maintains spatial signatures for each subscriber station for each conventional channel and calculates spatial multiplexing and demultiplexing weights using received signal measurements. In this manner, the signals from the current active subscriber stations, some of which may be active on the same conventional channel, are separated and interference and noise suppressed. When communicating from the base station to the subscriber stations, an optimized multi-lobe antenna radiation pattern tailored to the current active subscriber station connections and interference situation is created. The channels used may be partitioned in any manner. In one embodiment the channels used may be partitioned as defined in the GSM (Global System for Mobile Communications) air interface, or any other time division air interface protocol, such as Digital Cellular, PCS (Personal Communication System), PHS (Personal Handyphone System) or WLL (Wireless Local Loop). Alternatively, continuous analog or CDMA channels can be used.

The outputs of the antennas are connected to a duplexer switch 7, which in a TDD embodiment, may be a time switch. Two possible implementations of the duplexer switch are as a frequency duplexer in a frequency division duplex (FDD) system, and as a time switch in a time division duplex (TDD) system. When-receiving, the antenna outputs are connected via the duplexer switch to a receiver 5, and are converted down in analog by RF receiver ("RX") modules 5 from the carrier frequency to an FM intermediate frequency ("IF"). This signal then is digitized (sampled), by analog to digital converters ("ADCs") 9. Final down-converting to baseband is carried out digitally. Digital filters can be used to implement the down-converting and the digital filtering, the latter using finite impulse response (FIR) filtering techniques. This is shown as block 13. The invention can be adapted to suit a wide variety of RF and IF carrier frequencies and bands.

There are, in the example of GSM, eight down-converted outputs from each antenna's digital filter 13, one per receive timeslot. The particular number of timeslots can be varied to suit network needs. While GSM uses eight uplink and eight downlink timeslots for each TDMA frame, desirable results can also be achieved with any number of TDMA timeslots for the uplink and downlink in each frame. For each of the eight receive timeslots, the four down-converted outputs from the four antennas are fed to a digital signal processor (DSP) 31 an ASIC (Application Specific Integrated Circuit) or FPGA (Field Programmable Gate Array) (hereinafter "timeslot processor") for further processing, including calibration, according to one aspect of this invention. For TDMA signals, eight Motorola DSP56300 Family DSPs can be used as timeslot processors, one per receive timeslot. The timeslot processors 17 monitor the received signal power and estimate the frequency offset and time alignment. They also determine smart antenna weights for each antenna element. These are used in the SDMA scheme to determine a signal from a particular remote user and to demodulate the determined signal. In a WCDMA system, the channels may be separated using codes in an FPGA and then further processed separately perhaps using separate DSPs for different users. Instead of being timeslot processors the processors are channel processors.

The output of the timeslot processors 17 is demodulated burst data for each of the eight receive timeslots. This data is sent to the host DSP processor 31 whose main function is to control all elements of the system and interface with the higher level processing, which is the processing which deals with what signals are required for communications in all the different control and service communication channels defined in the system's communication protocol. The host DSP 31 can be a Motorola DSP56300 Family DSP. In addition, timeslot processors send the determined receive weights for each user terminal to the host DSP 31. The host DSP 31 maintains state and timing information, receives uplink burst data from the timeslot processors 17, and programs the timeslot processors 17. In addition it decrypts, descrambles, checks error correcting code, and deconstructs bursts of the uplink signals, then formats the uplink signals to be sent for higher level processing in other parts of the base station.

Furthermore DSP 31 may include a memory element to store data, instructions, or hopping functions or sequences. Alternatively, the base station may have a separate memory element or have access to an auxiliary memory element. With respect to the other parts of the base station it formats service data and traffic data for further higher processing in the base station, receives downlink messages and traffic data from the other parts of the base station, processes the downlink bursts and formats and sends the downlink bursts to a transmit controller/modulator, shown as 37. The host DSP also manages programming of other components of the base station including the transmit controller/modulator 37 and the RF timing controller shown as 33.

The RF controller 33 reads and transmits power monitoring and control values, controls the duplexer 7 and receives timing parameters and other settings for each burst from the host DSP 31.

The transmit controller/modulator 37, receives transmit data from the host DSP 31. The transmit controller uses this data to produce analog IF outputs which are sent to the RF transmitter (TX) modules 39. Specifically, the received data bits are converted into a complex modulated signal, up-converted to an IF frequency, sampled, multiplied by transmit weights obtained from host DSP 31, and converted via digital to analog converters ("DACs") which are part of transmit controller/modulator 37 to analog transmit waveforms. The analog waveforms are sent to the transmit modules 39. The transmit modules 39 up-convert the signals to the transmission frequency and amplify the signals. The amplified transmission signal outputs are sent to antennas 3 via the duplexer/time switch 7. In a CDMA system, the signals may also be spread and scrambled using appropriate codes.

User Terminal Structure

Figure 3:
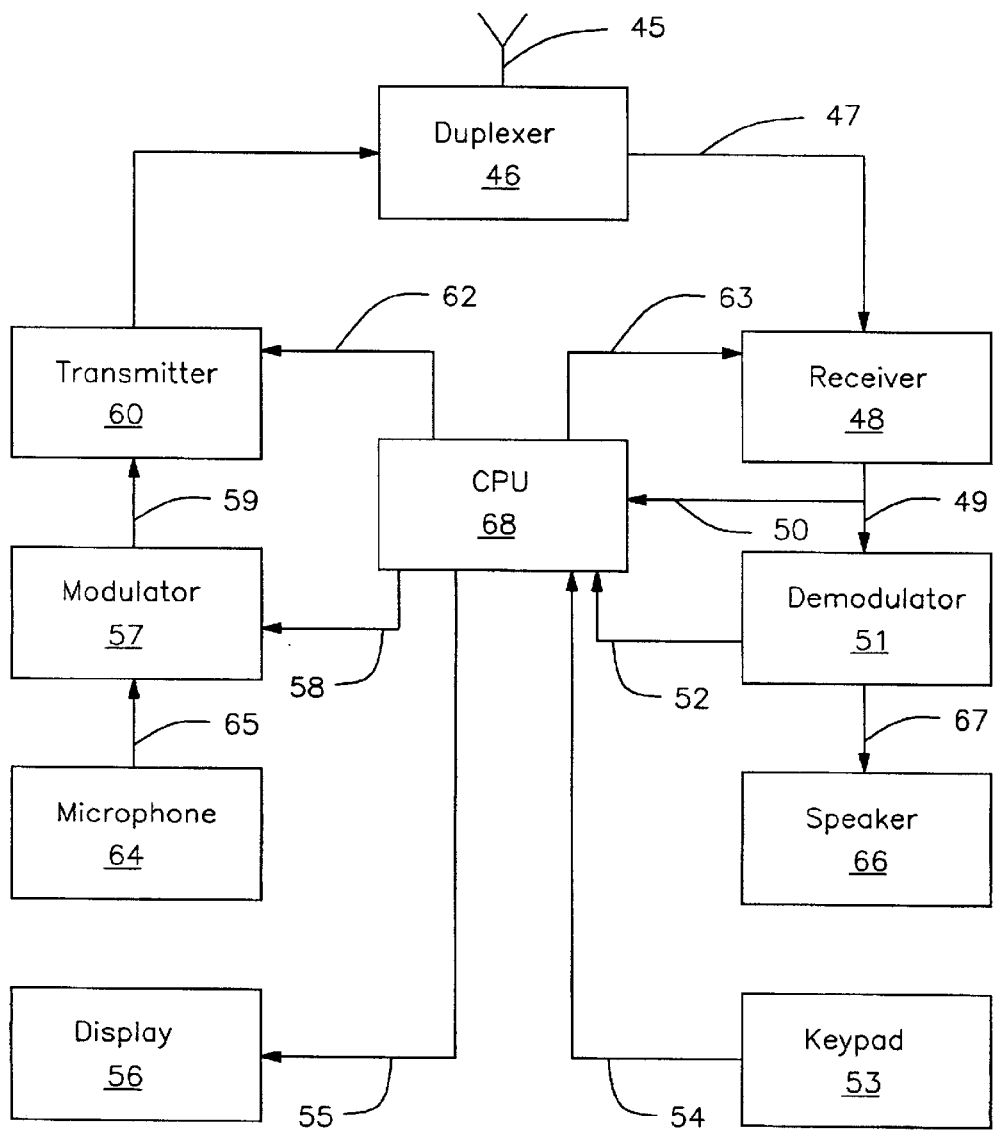
FIG. 3 is a block diagram of a remote terminal on which an embodiment of the invention can be implemented.

FIG. 3 depicts an example component arrangement in a remote terminal that provides data or voice communication. The remote terminal's antenna 45 is connected to a duplexer 46 to permit the antenna 45 to be used for both transmission and reception. The antenna can be omni-directional or directional. For optimal performance, the antenna can be made up of multiple elements and employ spatial processing as discussed above for the base station. In an alternate embodiment, separate receive and transmit antennas are used eliminating the need for the duplexer 46. In another alternate embodiment, where time division duplexing is used, a transmit/receive (TR) switch can be used instead of a duplexer as is well known in the art. The duplexer output 47 serves as input to a receiver 48. The receiver 48 produces a down-converted signal 49, which is the input to a demodulator 51. A demodulated received sound or voice signal 67 is input to a speaker 66.

The remote terminal has a corresponding transmit chain in which data or voice to be transmitted is modulated in a modulator 57. The modulated signal to be transmitted 59, output by the modulator 57, is up-converted and amplified by a transmitter 60, producing a transmitter output signal 61. The transmitter output 61 is then input to the duplexer 46 for transmission by the antenna 45.

The demodulated received data 52 is supplied to a remote terminal central processing unit 68 (CPU) as is received data before demodulation 50. The remote terminal CPU 68 can be implemented with a standard DSP (digital signal processor) device such as a Motorola series 56300 Family DSP. This DSP can also perform the functions of the demodulator 51 and the modulator 57. The remote terminal CPU 68 controls the receiver through line 63, the transmitter through line 62, the demodulator through line 52 and the modulator through line 58. It also communicates with a keyboard 53 through line 54 and a display 56 through line 55. A microphone 64 and speaker 66 are connected through the modulator 57 and the demodulator 51 through lines 65 and 67, respectively for a voice communications remote terminal. In another embodiment, the microphone and speaker are also in direct communication with the CPU to provide voice or data communications. Furthermore remote terminal CPU 68 may also include a memory element to store data, instructions, and hopping functions or sequences. Alternatively, the remote terminal may have a separate memory element or have access to an auxiliary memory element.

In one embodiment, the speaker 66, and the microphone 64 are replaced or augmented by digital interfaces well-known in the art that allow data to be transmitted to and from an external data processing device (for example, a computer). In one embodiment, the remote terminal's CPU is coupled to a standard digital interface such as a PCMCIA interface to an external computer and the display, keyboard, microphone and speaker are a part of the external computer. The remote terminal's CPU 68 communicates with these components through the digital interface and the external computer's controller. For data only communications, the microphone and speaker can be deleted. For voice only communications, the keyboard and display can be deleted.

General Matters

In the description above, for the purposes of explanation, numerous specific details are set forth in order to provide a thorough understanding of the present invention. It will be apparent, however, to one skilled in the art that the present invention may be practiced without some of these specific details. In other instances, well-known circuits, structures, devices, and techniques have been shown in block diagram form or without detail in order not to obscure the understanding of this description.

The present invention includes various steps. The steps of the present invention may be performed by hardware components, such as those shown in FIGS. 1 and 2, or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the base station or the user terminal. However, many of the steps described as being performed by the base station may be performed by the user terminal and vice versa.

Furthermore, the invention is equally applicable to systems in which terminals communicate with each other without either one being designated as a base station, a user terminal, a remote terminal or a subscriber station. Thus, the present invention is equally applicable and useful in a peer-to-peer wireless network of communications devices using spatial processing. These devices may be cellular phones, PDA's, laptop computers, or any other wireless devices. Generally, since both the base stations and the terminals use radio waves, these communications devices of wireless communications networks may be generally referred to as radios.

In portions of the description above, only the base station is described as performing spatial processing using an adaptive antenna array. However, the user terminals can also contain antenna arrays, and can also perform spatial processing both on receiving and transmitting (uplink and downlink) within the scope of the present invention. Any step or process attributed to the uplink can be instead performed on the downlink and vice versa. Furthermore, in portions of the description above, certain functions performed by a base station could be coordinated across the network, or assigned to other components of the system.

The present invention may be provided as a computer program product, which may include a machine-readable medium having stored thereon instructions, which may be used to program a computer (or other electronic devices) to perform la process according to the present invention. The machine-readable medium may include, but is not limited to, floppy diskettes, optical disks, CD-ROMs, and magneto-optical disks, ROMs, RAMS, EPROMS, EEPROMS, magnet or optical cards, flash memory, or other type of media/ machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

What is claimed is:

1. A method comprising:
receiving signals at an antenna array from a plurality of different locations;
deriving characterizations of the spatial parameters of the received signals;
receiving measurements of a plurality of different signals transmitted from the antenna array to a plurality of different locations;
deriving characterizations of the spatial parameters of the transmitted signals from the received measurements; and
generating a transformation function for producing transmit spatial parameters based on measurements of received signals using the receive spatial parameter characterizations and the transmit spatial parameter characterizations.

2. The method of claim 1, wherein the characterizations of the spatial parameters of the received signals comprise spatial signatures of the received signals, wherein the characterizations of the spatial parameters of the transmitted signals comprise spatial signatures of the transmitted signals, and wherein the transformation function converts a receive spatial signature to a transmit spatial signature.

3. The method of claim 2, further comprising:
receiving traffic from a remote radio;
deriving a received traffic spatial signature for the received traffic;
applying the transformation function to convert the received traffic spatial signature to a transmit traffic spatial signature; and
transmitting traffic to the remote radio using the transmit traffic spatial signature.

4. The method of claim 2, wherein deriving receive spatial signatures comprises measuring relative phase and amplitude at different elements of the antenna array.

5. The method of claim 2, wherein deriving receive spatial signatures comprises rendering the relative phases and amplitudes as a sequence of complex numbers, each complex number corresponding to an element of the antenna array.

6. The method of claim 2, wherein the received signals contain the received measurements and wherein generating a transformation function comprises pairing receive spatial signatures for received signals with transmit spatial signatures for the corresponding received measurements, forming an ordered matrix of receive spatial signatures and a matrix of transmit spatial signatures ordered in accordance with the pairing and solving the matrices for the transformation function.

7. The method of claim 6, wherein solving for the transformation function comprises multiplying the matrix of transmit spatial signatures by the Hermitian of the matrix of receive spatial signatures and multiplying the result by the inverse the product of the matrix of receive spatial signatures and the Hermitian of the matrix of receive spatial signatures.

8. The method of claim 2, further comprising selecting some of the received signals based on a quality measure from among the received signals and wherein deriving receive spatial signatures comprises deriving receive spatial signatures only for the selected signals.

9. The method of claim 8, wherein selecting some of the received signals comprises selecting signals corresponding to a clearer channel and lower mobility.

10. The method of claim 1, wherein the characterizations of the spatial parameters of the received signals comprise covariance matrices of measurements of the received signals, wherein the characterizations of the spatial parameters of the transmitted signals comprise covariance matrices of measurements of the transmitted signals, and wherein the transformation function converts a receive covariance matrix to a transmit covariance matrix.

11. The method of claim 1, wherein the characterizations of the spatial parameters of the received signals comprise eigenvectors based on covariance matrices from the received signals, wherein the characterizations of the spatial parameters of the transmitted signals comprise eigenvectors based on covariance matrices from the transmitted signals, and wherein the transformation function converts a receive eigenvector to a transmit eigenvector.

12. The method of claim 1, wherein the characterizations of the spatial parameters of the received signals comprise weight vectors based on the received signals, wherein the characterizations of the spatial parameters of the transmitted signals comprise weight vectors based on the transmitted signals, and wherein the transformation function converts a receive weight vector to a transmit weight vector.

13. The method of claim 1, wherein receiving signals comprises receiving signals in traffic channels from a plurality of different remote terminals.

14. The method of claim 1, wherein receiving measurements comprises receiving feedback from a plurality of different remote terminals.

15. The method of claim 14, wherein receiving feedback comprises receiving closed loop transmit diversity packets from the remote terminals.

16. The method of claim 15, wherein the closed loop transmit diversity packets are assembled in accordance with a standard for WCDMA (Wideband Code Division Multiple Access).

17. The method of claim 15, wherein receiving feedback comprises receiving power control feedback from the remote terminals.

18. The method of claim 17, wherein the power control feedback is received in packets assembled in accordance with a standard for GSM (Global System for Mobile Communications).

19. The method of claim 1, wherein receiving measurements comprises receiving power measurements of the transmitted signals.

20. A machine-readable medium having stored thereon data representing instructions which, when executed by a machine, cause the machine to perform operations comprising:
receiving signals at an antenna array from a plurality of different locations;
deriving characterizations of the spatial parameters of the received signals;
receiving measurements of a plurality of different signals transmitted from the antenna array to a plurality of different locations;
deriving characterizations of the spatial parameters of the transmitted signals from the received measurements;

generating a transformation function for producing transmit spatial parameters based on measurements of received signals using the receive spatial parameter characterizations and the transmit spatial parameter characterizations.

21. The medium of claim 20, wherein the characterizations of the spatial parameters of the received signals comprise spatial signatures of the received signals, wherein the characterizations of the spatial parameters of the transmitted signals comprise spatial signatures of the transmitted signals, and wherein the transformation function converts a receive spatial signature to a transmit spatial signature.

22. The medium of claim 20, wherein the characterizations of the spatial parameters of the received signals comprise covariance matrices of measurements of the received signals, wherein the characterizations of the spatial parameters of the transmitted signals comprise covariance matrices of measurements of the transmitted signals, and wherein the transformation function converts a receive covariance matrix to a transmit covariance matrix.

23. The medium of claim 20, wherein the characterizations of the spatial parameters of the received signals comprise eigenvectors based on covariance matrices from the received signals, wherein the characterizations of the spatial parameters of the transmitted signals comprise eigenvectors based on covariance matrices from the transmitted signals, and wherein the transformation function converts a receive eigenvector to a transmit eigenvector.

24. The medium of claim 20, wherein the characterizations of the spatial parameters of the received signals comprise weight vectors based on the received signals, wherein the characterizations of the spatial parameters of the transmitted signals comprise weight vectors based on the transmitted signals, and wherein the transformation function converts a receive weight vector to a transmit weight vector.

25. The medium of claim 20, further comprising instructions which, when executed by the machine, cause the machine to perform further operations comprising:

receiving traffic from a remote radio;

deriving a received traffic spatial signature for the received traffic;

applying the transformation function to convert the received traffic spatial signature to a transmit traffic spatial signature; and transmitting traffic to the remote radio using the transmit traffic spatial signature.

26. The medium of claim 20, wherein the instructions for receiving measurements comprise instructions which, when executed by the machine, cause the machine to perform further operations comprising receiving feedback signals from a plurality of different remote terminals.

27. The medium of claim 20, wherein the instructions for receiving measurements comprise instructions which, when executed by the machine, cause the machine to perform further operations comprising receiving power control feedback from the remote terminals.

28. The medium of claim 20, wherein the received signals contain the received measurements and wherein the instructions for generating a transformation function comprise instructions which, when executed by the machine, cause the machine to perform further operations comprising pairing receive spatial signatures for received signals with transmit spatial signatures for the corresponding received measurements, forming an ordered matrix of received spatial signatures and a matrix of transmit spatial signatures ordered in accordance with the pairing and solving the matrices for the transformation function.

29. An apparatus comprising:

a transmitter to transmit a plurality of different signals to a plurality of different remote locations;

a receiver to receive signals at an antenna array from a plurality of different locations, at least a portion of the received signals including measurements of at least a portion of the different transmitted signals; and a processor to derive characterizations of the spatial parameters of the received signals, to receive measurements of the transmitted signals, to derive characterizations of the spatial parameters of the transmitted signals from the received measurements, and to generate a transformation function for producing transmit spatial parameters based on measurements of received signals using the receive spatial parameter characterizations and the transmit spatial parameter characterizations.

30. The apparatus of claim 29, wherein the characterizations of the spatial parameters of the received signals comprise spatial signatures of the received signals, wherein the characterizations of the spatial parameters of the transmitted signals comprise spatial signatures of the transmitted signals, and wherein the transformation function converts a receive spatial signature to a transmit spatial signature.

31. The apparatus of claim 29, wherein the receiver further receives traffic from a remote radio;

the processor further derives a received traffic spatial signature for the received traffic and applies the transformation function to convert the received traffic spatial signature to a transmit traffic spatial signature; and the transmitter further transmits traffic to the remote radio using the transmit traffic spatial signature.

32. The apparatus of claim 29, wherein the received signals are received in traffic channels from a plurality of different remote terminals.

33. The apparatus of claim 29, wherein the received measurements are feedback signals from a plurality of different remote terminals.

34. The apparatus of claim 33, wherein the feedback signals are closed loop transmit diversity packets from the remote terminals.

35. The apparatus of claim 33, wherein the feedback signals are power control feedback from the remote terminals.

36. The apparatus of claim 29, wherein the processor further selects some of the received signals based on a quality measure from among the received signals and wherein the processor deriver spatial signatures only for the selected signals.

\* \* \* \* \*